United States Patent [19]

Gilleman

[11] 4,193,248
[45] Mar. 18, 1980

[54] VEHICLE PROTECTIVE SYSTEM

[75] Inventor: Joseph T. G. Gilleman, Sint-Denijs-Westrem, Belgium

[73] Assignee: Sperry Rand Corporation, New Holland, Pa.

[21] Appl. No.: 965,009

[22] Filed: Nov. 30, 1978

[30] Foreign Application Priority Data

Dec. 2, 1977 [GB] United Kingdom ............... 50290/77
Jan. 5, 1978 [GB] United Kingdom .................. 268/78

[51] Int. Cl.² ............................................. A01D 75/18
[52] U.S. Cl. ............................... 56/10.2; 56/DIG. 15; 241/34
[58] Field of Search ............... 56/10.2, DIG. 15, 13.9, 56/DIG. 1; 241/34, 35

[56] References Cited

U.S. PATENT DOCUMENTS

| | | | |
|---|---|---|---|
| 3,896,608 | 7/1975 | Garrott | 56/10.2 |
| 3,959,953 | 6/1976 | Garrott | 56/10.2 |

Primary Examiner—Jay N. Eskovitz
Attorney, Agent, or Firm—Frank A. Seemar; John B. Mitchell; Larry W. Miller

[57] ABSTRACT

The invention relates to crop harvesting machines fitted with detector means for detecting the presence of undesirable objects such as metallic objects. The invention seeks to solve the problem of known machines in which some form of slipping clutch is provided which operates when drive is arrested due to the presence of an undesirable object and which may overheat, and the problem of normal drive being re-established without first ensuring the removal of the offending object. According to the invention a harvesting machine comprises crop processing means, feeder means for feeding crop material to the processing means, a drive train for driving the feeder means, and detector means for detecting undesirable objects passing through the feeder means, the detector means being operable upon the detection of an undesirable object to initiate instantaneous arrest of the drive to the feeder means and to break the drive train for the feeder means.

The arrest of the drive to the feeder means may be virtually simultaneously with, or slightly after, the breaking of the feeder means drive train.

9 Claims, 19 Drawing Figures

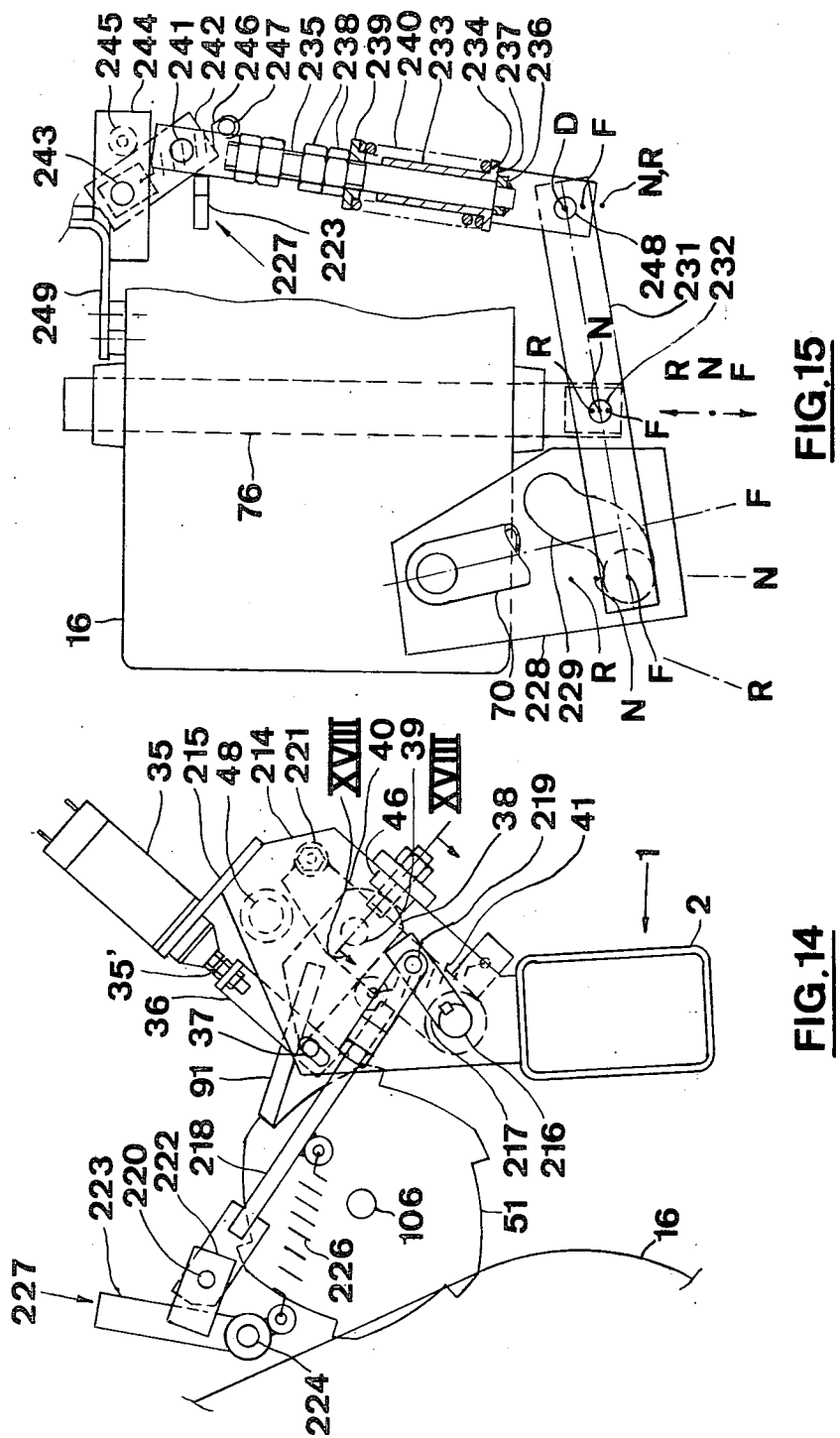

VEHICLE PROTECTIVE SYSTEM

BACKGROUND OF THE INVENTION

1. Field of the Invention

The present invention pertains to crop harvesting machines and more particularly to such machines comprising apparatus for detecting the presence of undesirable objects in the machine.

2. Description of the Prior Art

A variety of objects such as stones, pieces of wood, plastics and metal may lie in the path of a harvesting machine which cuts or picks up crop and these are liable to cause damage to the crop processing means within the machine. Harvesting machines which are particularly subject to such damages are forage harvesters. The crop processing means in a forage harvester comprise a cutterhead and associated shearbar which are of a precision character and have fine clearances and are buried in the body of the machine, whereby ready access thereto is denied. A cutterhead normally operates at a high rotational speed and has considerable inertia so that severe damage can arise if foreign objects reach the cutterhead. Pieces of wood are not generally a severe hazard. Stones are more so but generally splinter although they cause chipped blades on the cutterhead. Plastics and nonferrous metals are rare, and in any case relatively soft. Thus the main risk arises from ferrous metal objects which are both numerous and harmful. Such undesirable objects may be whole or broken parts that have become detached from machines, tools which have been left in the field or which have bounced out of moving machines, hitch pins, fencing stakes and scrap dumped by intruders. The high present-day level of mechanisation, together with the pressures on a diminishing labour force, have probably led to an increased risk of ferrous scrap in all areas, augmented near towns by habits of waste disposal.

Whether or not they give rise to damage to a machine, metal objects passing through will find their way into the crop processed by the machine and may ultimately injure livestock fed with it.

Detectors in general and metal detectors employed on forage harvesters are already known in the art. However, prior art devices have one or more inherent disadvantages rendering them of little value in certain applications, especially in the reliable protection of expensive crop harvesting machinery. Known metal detectors often operate at high excitation frequencies and are susceptible to the presence of moisture, various types of vegetation, vibration, or the like. Therefore, they impose on the machine operator the serious burden of continuous monitoring and adjustment or calibration of the detection device. Even at relative low excitation frequencies, such detectors are adversely affected to a significant extent by an over-extensive scanning area, thereby rendering them unusable for use where high accuracy, reliability and freedom from generation of false alarms is demanded. Additionally, prior art detection devices are located at positions which, for one reason or another, may fail adequately to detect the presence of incoming foreign objects. An example of a detection device located at a position within a crop harvesting machine, which has been found less than satisfactory, is illustrated in the U.S. Pat. No. 3,757,501 which teaches the use of a detection device mounted in the floor plate of the header of a harvesting machine. With such a machine, it has been found that undesirable objects located on top of the incoming mat of crop material can go undetected. Furthermore, this location of the detection device creates the situation where each alternative attachment for the machine has to incorporate a detection device, rather than it being standard equipment in the body of the forage harvester, which increases the cost of the attachments.

Further, it is also known to use drive arresting means in combination with metal detectors on forage harvesters such that upon detection of an undesirable object, the drive to a crop feeder mechanism is stopped. Thereupon, a safety clutch in the drive train becomes operative. Hence the movement of the feeder mechanism is stopped abruptly which is desirable in order to prevent the passage of the detected undesirable object further into the machine. The operator can then reverse the feeder drive mechanism to remove the undesirable object. However, this abrupt arresting of the drive to the feeder mechanism may be harmful to the drive means itself. Also, as long as the operator takes no action, the safety clutch continues to slip and prolonged slipping is undesirable as it tends to result in overheating. Furthermore, after the drive to the feeder mechanism has been stopped by the operation of the detection device, it could happen that, rather than reversing the drive to the feeder mechanism to expel the undesirable object from the machine, the operator re-engages the feeder mechanism drive in the normal working direction by mistake. This, of course, would result in the undesirable object being fed to the cutterhead or other crop processing means and defeat the object of providing the detection device. Such an arrangement is disclosed in U.S. Pat. No. 3,959,953.

In still another known arrangement, a metal detector on a forage harvester has been combined with a feeder drive arresting device and an electric actuator which starts operating as soon as an undesirable object is detected. The electric actuator is coupled to a slip clutch mechanism in the drive train for the feeder mechanism and is operative upon detection of an undesirable object progressively to disengage the clutch mechanism. Thus this arrangement also gives rise to possible overheating and shock load problems and also makes it possible for the normal drive to be re-established before the detected object has been removed.

SUMMARY OF THE INVENTION

According to the invention a crop harvesting machine comprises crop processing means, feeder means for feeding crop material to the processing means, a drive train for driving the feeder means, and detector means for detecting undesirable objects passing through the feeder means, the detector means being operable upon the detection of an undesirable object to initiate instantaneous arrest of the drive to the feeder means and to break the drive train for the feeder means.

Preferably the drive train comprises a drive reversal mechanism which can be changed from a normal drive direction to a reverse drive direction, via a neutral position, first means being provided to permit manual operation of the drive reversal mechanism, and second means being provided which are rendered operable by the detector means automatically to change the drive reversal mechanism to the neutral position upon the detection of an undesirable object and thus break the drive train. The first and second means may comprise first and second linkage systems, respectively, the two systems being interrelated but operable independently.

Drive arrest means may form part of the second linkage system, the drive arrest means being operable to arrest the drive to the feeder means upon detection of an undesirable object. Preferably the drive arrest means comprise a ratchet wheel fixed to a shaft driven by the drive reversal mechanism and in turn driving the crop feeder means, a pawl carried by a link forming part of the second linkage system, and means for holding the pawl out of engagement with the ratchet wheel in the absence of an undesirable object and for permitting the pawl to engage the ratchet wheel when the presence of an undesirable object is detected by the detector means. The means for determining the position of the pawl relative to the ratchet wheel may be a solenoid which may be connected into an electrical circuit containing the detector means and protected by two electrical switches, one switch being located in part of the circuit common to both the detector means and the solenoid, and the other switch being located in part of the circuit peculiar to the solenoid.

Engagement of the pawl with the ratchet wheel on detection of an undesirable object can be arranged to result in the link carrying the pawl being kicked in a direction such as to re-position other members of the second linkage system so as automatically to change the drive reversal mechanism to the neutral position. The interrelationship between the first and second linkage systems may be such that when the second system has been actuated to change the drive reversal mechanism to neutral, the first system cannot be actuated to re-establish the normal direction of the drive reversal mechanism without first changing the latter to the reverse drive direction.

The drive reversal mechanism may comprise a reversible gearbox operable by a shift rod connected to both the first and second linkage systems and the shift rod may be actuated by the first and second linkage systems through a gear system. Alternatively, the shift rod may be actuated by the first and second linkage system through a lever pivotally connected to the shift rod intermediate the ends of the lever and pivotally connected at one end to the first linkage system and pivotally connected at the other end to the second linkage system. The pivotal connection between the lever and the first linkage system may comprise a roller which is in constant engagement with a cam slot in a link member of the first linkage system.

The detector means may be a ferrous metal detector comprising a signal generator operable to produce a continuous output signal during normal operation, and magnetic coil means operable to produce an electrical signal when a ferrous object moves within its field of operation, the electrical signal serving to interrupt the output signal from the signal generator and hence initiate the instantaneous arrest of the drive to the feeder means and the breaking of the feeder means drive train.

The invention is particularly applicable to forage harvesters which normally comprise at least one pair of rolls for compressing and feeding the crop to the crop processing means and in this case, the magnetic coil means of the metal detector means are preferably stationarily mounted within one of the rolls. This provides a more positive scanning of incoming crop material in which may be embedded metallic objects.

The arresting of the drive to the crop feeder means may be effected simultaneously with, or slightly after, the breaking of the feeder means drive train, the latter being desirable so as to reduce shock loads to a minimum when the drive to feeder means is arrested. The breaking of the feeder means drive train ensures that there is no load on the drive train during drive arrest and no components likely to overheat during this period.

BRIEF DESCRIPTION OF THE DRAWINGS

Two harvesting machines embodying the present invention will now be described in greater detail, by way of example, with reference to the accompanying drawings, in which:

FIG. 14 is a view similar to FIG. 12 but with the structure in another characterising position and with components removed for clarity, FIG. 15 is a view similar to FIG. 13 but with the structure in the position as shown in FIG. 14 and again with some components omitted for clarity.

DETAILED DESCRIPTION OF A PREFERRED EMBODIMENT

Figure 1:
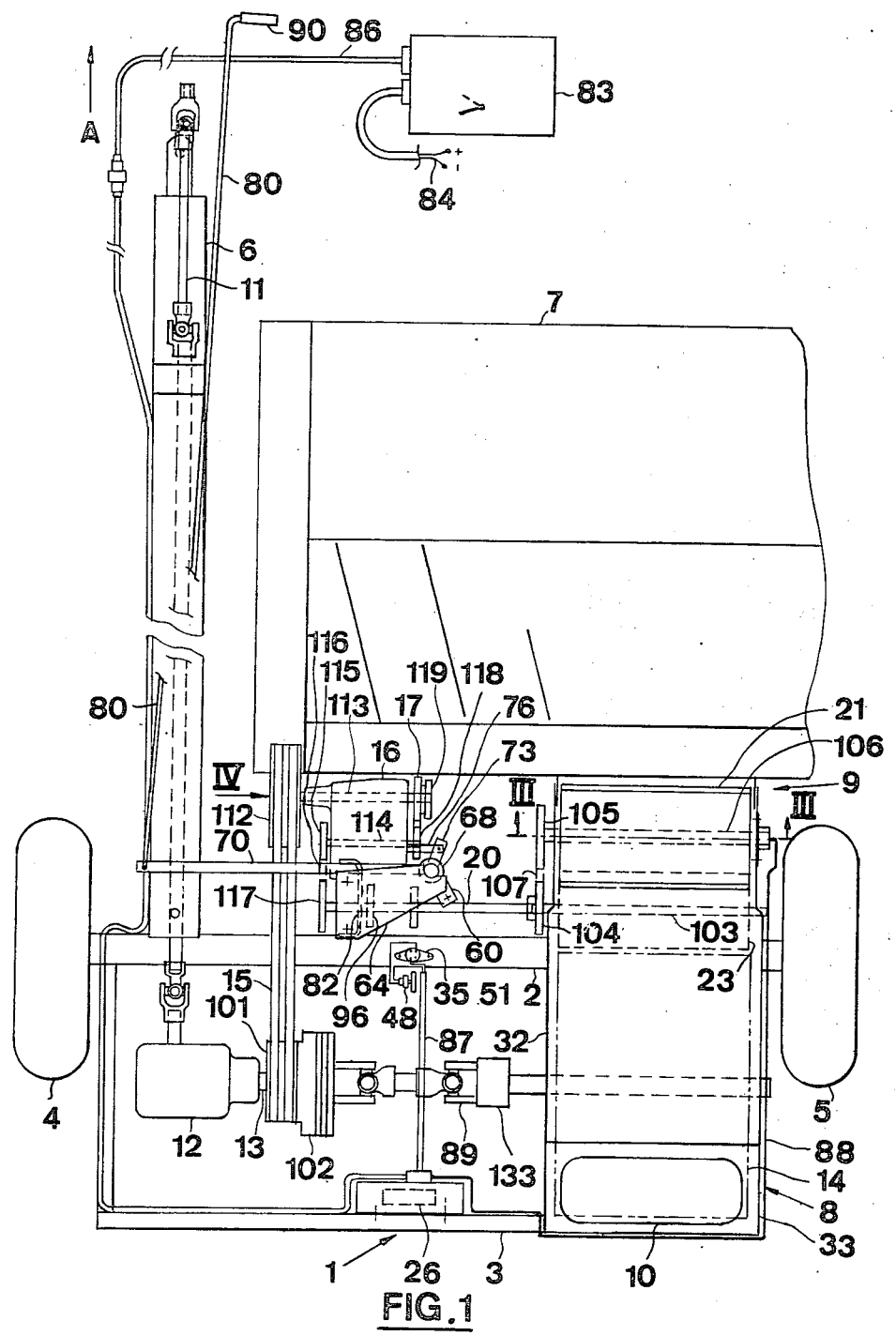
FIG. 1 is a schematic top view of a forage harvester of the pull type embodying the present invention.

The terms "forward", "rearward", "right-hand side", "left-hand side" used throughout the specification are with respect to the direction of movement of the machine in operation, except when specified otherwise.

With reference to FIGS. 1 to 11, the first embodiment comprises a pull-type forage harvester having a main frame 1 with transversely-extending square tubular beams 2 and 3. Ground-engaging wheels 4 and 5 are rotatably mounted on brackets (not shown) at the respective ends of the beam 2. The harvester is drawn in the operative direction A by a hitch 6 pivotably connected to the left-hand end of the beam 2. A crop pick-up attachment 7 is mounted on the frame 1 and is operable to deliver crop material to crop processing means 8 through crop feeder means 9. The crop processing means 8 comprise a rotatably mounted cutterhead 14 which is cooperable with the stationary shearbar 25 for processing the incoming crop material by chopping the crop into small pieces to form silage. The silage is conveyed to a spout 10 for discharge therethrough into a trailing wagon (not shown). The pick-up attachment 7 may be replaced by a row crop attachment or direct cut attachment, for example, in the conventional manner.

Power is delivered to the various operating mechanisms by a main drive shaft 11 which extends along and above the hitch 6. In operation the drive shaft 11 is coupled to the tractor PTO (not shown) at its forward end. The main drive shaft 11 is connected at its rear end to a gearbox 12 mounted adjacent the left-hand end of the frame 1. An output shaft 13 of the gearbox 12 extends at 90° relative to the main drive shaft 11 from the gearbox in a transverse direction towards the processing means 8. Connected to the output shaft 13 is a pair of V-pulleys 101 and a safety clutch 102. The safety clutch 102 is drivingly coupled to the cutterhead 14 at the right-hand side of the machine via a universal joint shaft 89 and a free-wheeling clutch 133 and is arranged to drive the cutterhead 14 in the direction B indicated in FIG. 2.

The crop feeder means 9 is generally conventional in design with a set of forward feed rollers 21 and 22 for compressing, feeding and directing the harvested crop to a pair of rear feed rollers 23 and 24, adjacent the shearbar 25. The rear feed rollers 23 and 24 feed the crop material into the cutterhead 14 over the shearbar 25 for processing (in this case, chopping) the crop material. The processed crop material (silage) is discharged rearwardly and upwardly through the discharge spout 10 by the movement imparted thereto by the cutterhead 14. The lower rear feed roller 24 is keyed on a shaft 103 which is coupled to an intermediate drive shaft 20. A sprocket 104 is secured to the shaft 103 at the left-hand side of the associated feed roller 24 and is aligned with another sprocket 105 on a stub shaft 106 supporting the lower and forward feed roller 22. A chain 134 is provided around the sprockets 104 and 105 so that the lower feed rollers 22 and 24 always are driven in unison and in the same direction. The shafts 103 and 106 are rotatably mounted at fixed locations in the side walls 32 and 33 of the machine.

The upper rear feed roller 23 is keyed on a shaft 107, supporting at its left-hand end a sprocket 108 which is aligned with a sprocket 109 on a shaft 110 supporting the upper and forward feed roller 21. A chain 111 is provided around the sprockets 108 and 109 so that both upper feed rollers 21–23 are driven in unison and in the same direction. The shafts 107 and 110, the sprockets 108 and 109 and the chain 111 have not been shown in FIG. 1 for the sake of clarity but are shown in FIG. 2.

The entire crop feeder mechanism 9 comprising the feed rollers 21, 22, 23 and 24 is driven from the gearbox 12 via V-belts 15 on the pulleys 101 on the output shaft 13 and another set of pulleys 112 on an input shaft 113 of a reversible and reduction gearbox 16. An output shaft 114 of the reduction and reversing gearbox 16 supports a sprocket 115 for transmitting drive to the intermediate shaft 20 via a chain 116 and a further sprocket 117, the sprocket 117 being keyed on the intermediate shaft 20. The reversing and reduction gearbox 16 comprises a set of gears and a shiftable double jaw clutch which are all of the conventional type and which therefore will neither be shown nor described in any further detail.

The intermediate shaft 20 supports a gear 96 which is arranged to mesh with a further gear on a further intermediate shaft which itself is rotatably mounted on the harvester frame 1 and which is coupled to the upper and rear feed roller shaft 107 via a universal joint shaft. The further gear, further intermediate shaft and the universal joint shaft are of the conventional type and are not shown in the drawings for the sake of clarity. Thus the upper feed rollers 21 and 23 are always driven in a direction opposite to the direction of drive of the feed rollers 22 and 24. The upper feed rollers 21 and 23 are floatingly mounted above the lower feed rollers 22 and 24 in a manner which is generally known in the art, and which is, therefore, not shown nor described in any detail. The forward feed rollers 21 and 22 are made of stainless steel for a reason to be explained.

The output shaft 114 of the reversing and reduction gearbox 16 supports at its end opposite to the sprocket 115 a gear 118 which is arranged to drive a further gear 17 which is freely rotatably mounted on the input shaft 113 and which is drivingly coupled to a sprocket 119 from which the pick-up attachment 7 is driven in a manner which is not shown, but which is conventional.

Signal generating means are provided comprising a constant signal generating means 26 and a magnetic coil means 27. The magnetic coil means 27 (FIG. 3) is adapted to interrupt the constant signal generating means 26 whenever undesirable objects move into the vicinity of the feed rolls 21 and 22. The constant signal generating means 26 is similar to the one described and shown in U.S. Pat. No. 3,959,953 to which reference is made.

The constant signal generating means 26 is mounted on the rear beam 3 of the frame 1 and creates a constant, noninterrupted signal during the normal operation of the harvester, i.e. when no tramp metal is moving through the feed rolls 21 and 22.

Electronically interconnected with the constant signal generating means 26 is the magnetic coil means 27 mounted within the lower front feed roll 22 (FIG. 3) of the harvester. The magnetic coil means 27 is similar in construction to that described in the U.S. Pat. No. 3,959,953.

The magnetic coil means 27 consists of a bar magnet 120 (FIG. 3) around which is wrapped coils of wire (not shown). The magnetic coil means 27 is rigidly mounted on the stationary shaft 28 by bolts 121. Prior to insertion into feed roller 22, shaft 28 is equipped with ball bearings 30. A collar 123 is then placed over the bearings 30 and inserted through an opening 124. The collar 123 contains a splined stub shaft 106 which extends through an opening 125 in the left-hand sidewall 32 of the machine. After the shaft 28 has been inserted through the opening 124, the collar 123 is secured to the left-hand sidewall of the feed roller 22 by bolts 126. The stub shaft 106 supports at its other extreme end the aforementioned sprocket 105 by which it is driven, and is rotatably supported on the sidewall 32 via ball bearings 132.

The right-hand end of the feed roller 22 is equipped with ball bearings 29 and a flangette 127. A steel shield 122 is placed on, and secured to, the outside of the flangette 127 and the feed roller 22. Finally, a mounting plate 128 is placed on the shaft 28 and secured to the side wall 33 by bolts 129. The mounting plate 128 contains a collar adapted to be inserted with a key to secure the shaft 28 in a fixed position. The mounting arrangement just described enables the feed roller 22 to rotate without having the shaft 28 rotating, thereby maintaining the magnetic-coil means 27 stationary within the feed roller 22.

In order to prevent the magnetic-coil means 27 from detecting any ferrous object forming part of the harvester, non-magnetic shields 130 are placed on either side of the magnet 120. Also, to prevent detection of the feed rollers 21 and 22 by the magnet 120, these rollers are constructed, as already mentioned above, of non-magnetic material, namely stainless steel.

Figure 4:
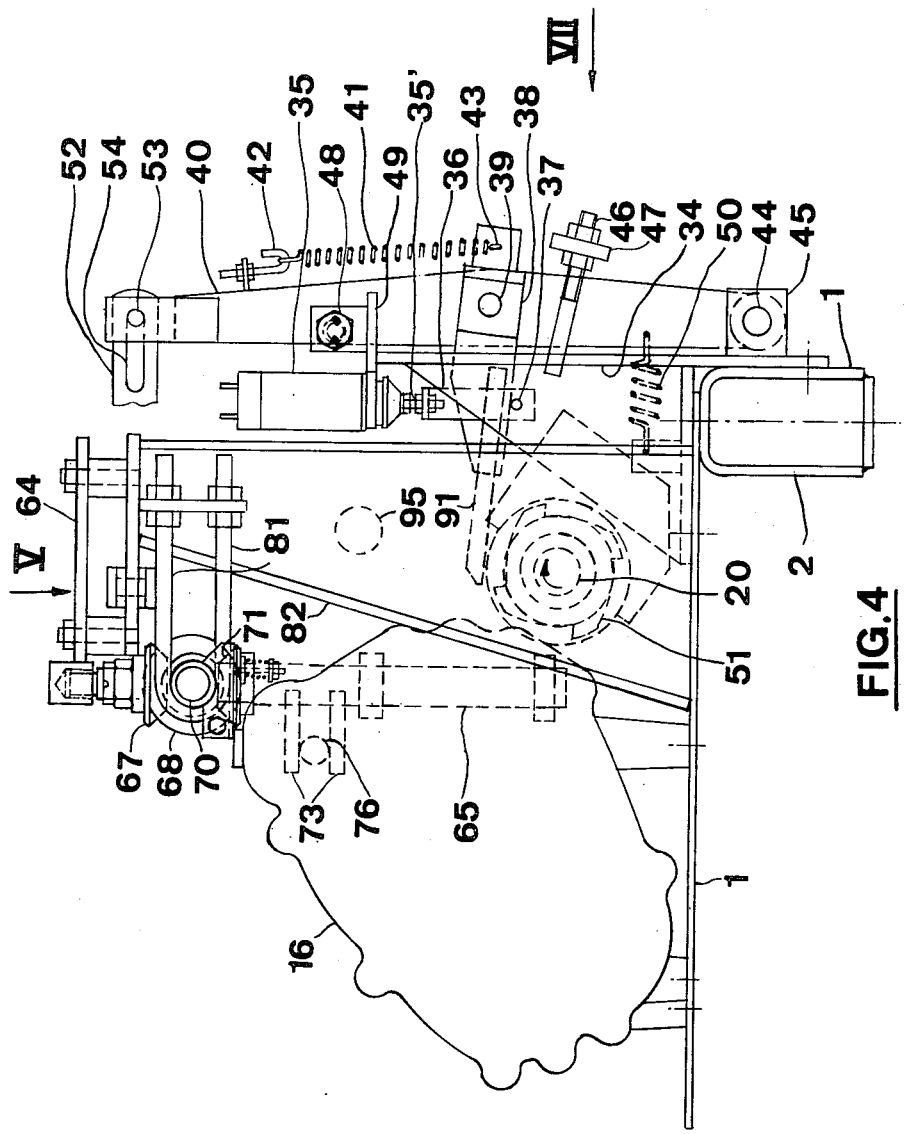
FIG. 4 is a side view of a portion of the machine shown in FIG. 1 on a larger scale and taken in the direction of arrow IV in FIG. 1 but with certain components removed for clarity.

The electronic circuit further also comprises a solenoid 35 which is best seen in FIG. 4. The barrel or body of the solenoid 35 is rigidly mounted on the main frame 1 of the harvester via a support 34 rigidly mounted on the frame 1. A control box 83 (FIG. 1) is provided and is arranged to be mounted on the pulling tractor (not shown) and coupled to the electric power source of the tractor at 84. The control box 83 is detachably coupled via cables 86 to the constant signal generating means 26, the latter being coupled to the solenoid 35 through leads 87 and to the magnetic-coil means 27 through leads 88. An electric switch 48 of the normally open type is included in the electric circuitry between the constant signal generally means 26 and the solenoid 35. A relay switch (not shown) is provided inside the control box 83 to interrupt power from the tractor battery to the solenoid 35 upon the detection of ferrous material. The solenoid also has a built-in relay to switch from "pull" to "hold" when the solenoid plunger is retracted. The pull current may, for example, be of the order of 20 Amps whilst the hold current may be of the order of 0.5 Amps.

The mechanism to break the drive train for the feed rolls 21 to 24 and pick-up attachment 7 is illustrated in FIGS. 4 to 11 and comprises a linkage system. A linkage 36 is connected to and extends downwardly from the plunger 35' of the solenoid 35 and normally supports at pin 37 a rock arm 38 which itself is pivotably mounted at 39 on a generally upright rock lever 40 and carries a pawl 91. Spring means 41, extending between a fixation point 42 on the rock lever 40 and a fixation point 43 on the rock arm 38 at a location opposite the solenoid 35 relative to the pivot 39, urge the rock arm 38 in a downward direction, opposite to the normally holding force of the solenoid 35. The rock lever 40 is pivotably mounted at its lower end via a pivot 44 on a member 45 which is rigidly secured to the frame 1. The rock lever 40 is movable between a first stop formed by the member 34 and a second stop 46 secured to the latter. The stop 46 comprises shock absorbing means 47.

The electric switch 48 is secured to a bracket 49 on the support 34 and is arranged to be closed by the rock lever 40 when in the position shown in FIG. 4 and to open when the lever 40 is moved to the right as seen in FIG. 4. Spring means 50 extend between the lever 40 and a fixed member of the frame 1 and urge the lever 40 towards the left as seen in FIG. 4, i.e. to the closed position of the switch 48.

A ratchet 51 is fixed to the intermediate shaft 20 from which all the feed rollers 21 to 24 are driven. During the normal operation of the forage harvester, the solenoid 35 receives a constant signal from the signal generating means 26 and is energised thereby, thus maintaining the rock arm 38 in the retracted position (the raised position shown in FIG. 4). This causes the pawl 91 on the arm 38 to be disengaged from the teeth of the ratchet 51.

Figures 5, 6:
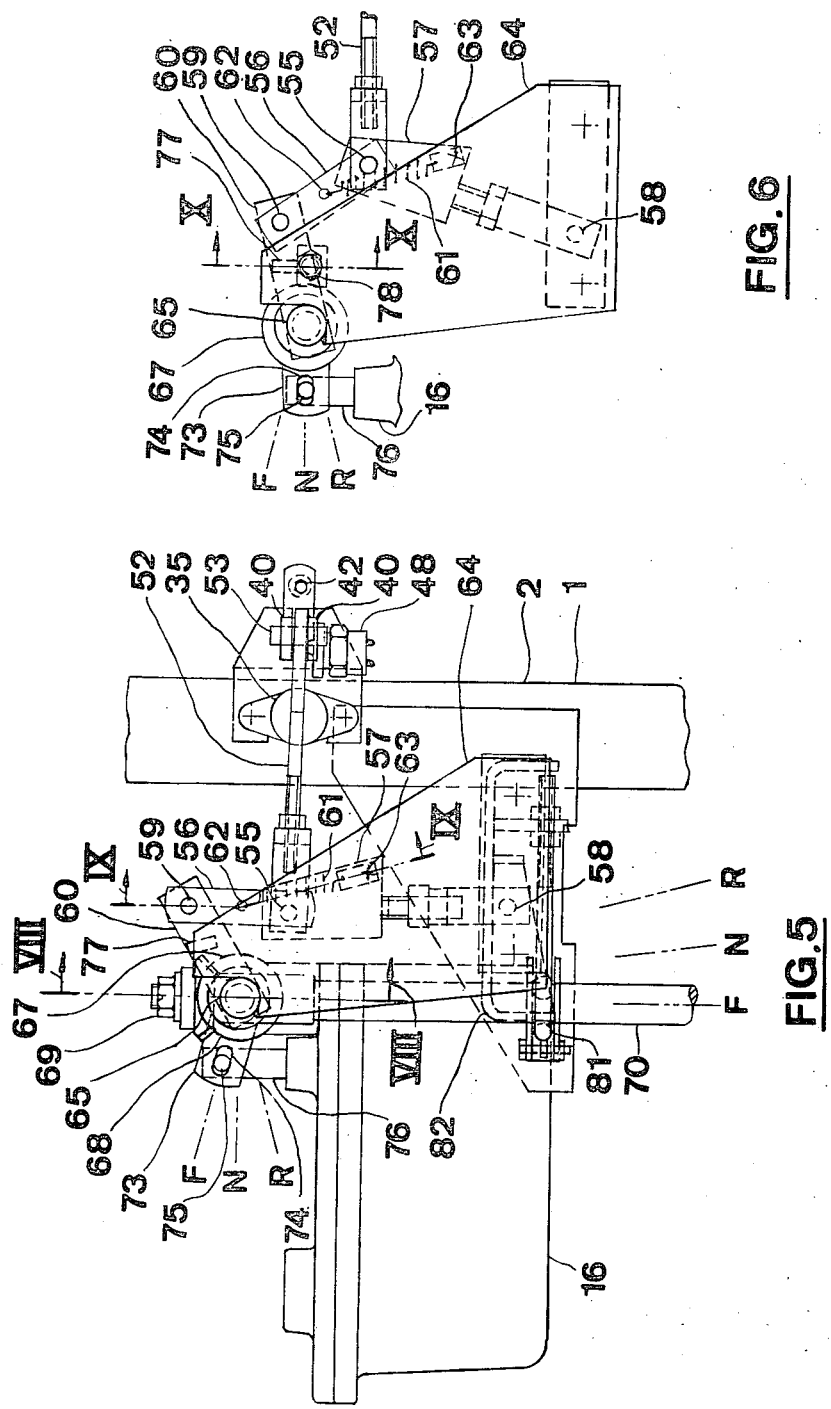
FIG. 5 is a top view taken in the direction of arrow V in FIG. 4 but again with certain components removed for clarity.
FIG. 6 is a view similar to FIG. 5 but with further components omitted and with the components shown in another characterising position.
Figure 10:
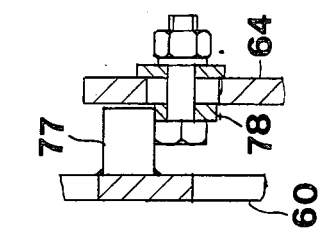
FIG. 10 is a partial sectional view taken along the line X—X of FIG. 6.
Figure 9:
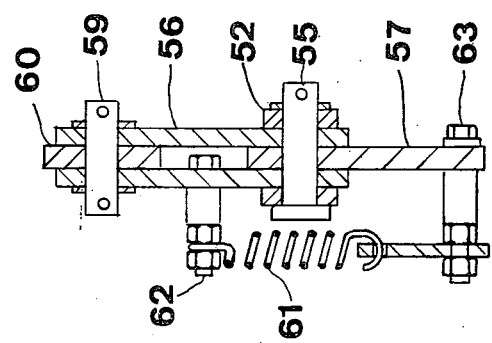
FIG. 9 is a partial sectional view taken along the line IX—IX of FIG. 5.
Figure 8:
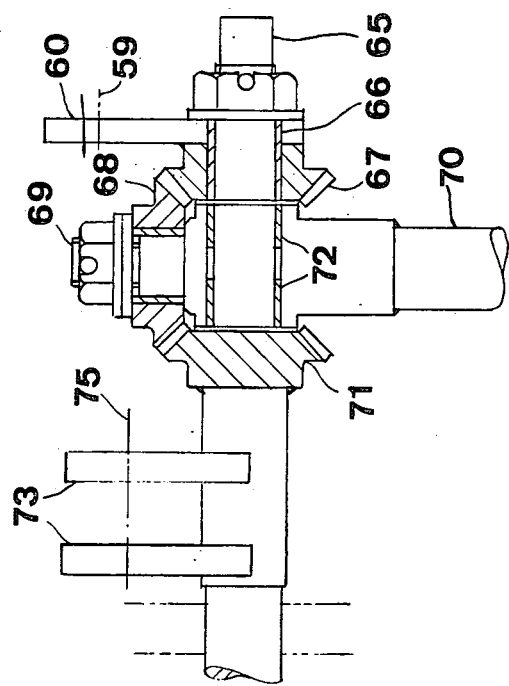
FIG. 8 is a partial sectional view taken along the line VIII—VIII of FIG. 5.
Figure 11:
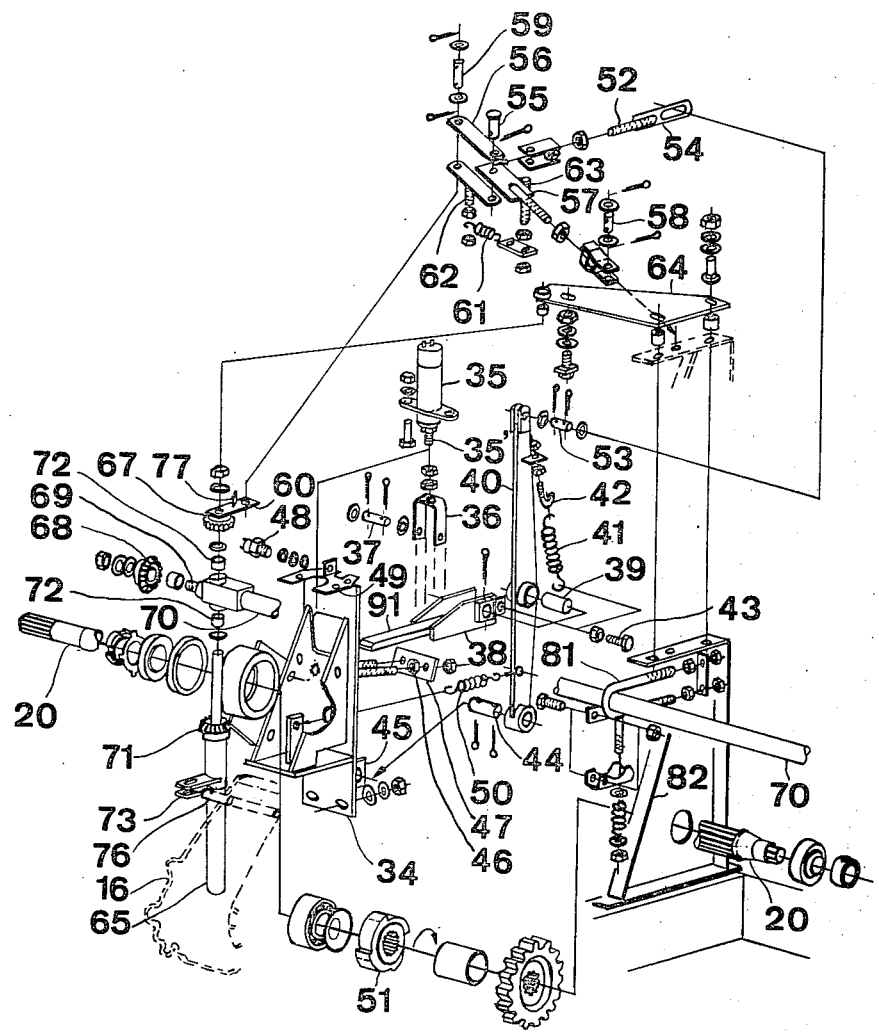
FIG. 11 is an exploded view of the structure of FIG. 5.

As can be best seen in FIGS. 4, 5 and 6, the rock lever 40 is pivotably coupled at its top end to a link 52 via a pin 53 slidably engaging elongated slot 54 in the link 52. The link 52 is pivotably connected at its other end via a pivot pin 55 to links 56 and 57. Link 57 is pivotably mounted at 58 to a fixed member 64 of the frame 1. Link 56 is pivotably coupled at 59 to a rock arm 60 to be described in detail hereinafter. Resilient means 61 extend between points 62 and 63 intermediate the extreme ends of the links 56 and 57.

The rock arm 60 is pivotably mounted at its other end on a shaft 65 via a bushing 66. A conical gear 67 is fixed to the arm 60 concentrically with the shaft 65 and is arranged constantly to mesh with a further conical gear 68, which itself is freely rotatably mounted on an end 69 of an arm 70. The conical gear 68 in turn meshes with a third conical gear 71 which is keyed on the shaft 65 at the side opposite to the first conical gear 67 relative to the arm 70. The arm 70 is rotatably mounted on the shaft 65 via bushings 72 intermediate the first and third conical gear 67 and 71. The shaft 65 supports a pair of further arms 73 which are pivotably coupled via an elongated aperture 74 and a pin 75 slidably engaging the latter to a shift rod 76 of the reduction and reversing gearbox 16. The shift rod 76 is arranged in the conventional and generally known manner to shift gears within the reduction and reversing gearbox between three positions, namely forward drive (F) in which the feed rollers 21 to 24 are driven in a direction so as to feed crop material rearwardly therebetween towards the cutterhead 14, neutral (N) in which drive to the feed rollers is interrupted, and reverse drive (R) in which the feed rollers are driven in a reverse direction so as to discharge material from therebetween forwardly of the machine.

A stop 77 is welded on the arm 60 for abutting an abutment 78 (shown only in FIGS. 6 and 10) on the stationary member 64 of the frame 1.

The arm 70 is extended in a transverse direction towards the left-hand side of the machine where it is pivotably coupled to a conventional push-pull rod 80 (FIG. 1) which extends in a forward direction above the hitch 6 towards the tractor (not shown). A stop 81 on a member 82 fixed to the frame 1 extends around the arm 70 and restricts the movement thereof to the left as seen in FIG. 5.

OPERATION OF THE PREFERRED EMBODIMENT

In operation, the machine is pulled in the field behind a tractor and power is supplied to the machine from the tractor PTO which is coupled to the power input shaft 11. The pick-up means 7, or other attachment, is lowered to the operative position and driven to lift crop material from the ground and to convey it to the feed rollers 21 to 24. The feed rollers 21, 22 and 23, 24 are driven to take crop material received from the pick-up attachment 7 therebetween and feed it in a rearward direction towards the cutterhead 14. The cutterhead 14 is driven through the shaft 13 from the gearbox 12 and cooperates with the shearbar 25 to chop the crop into small pieces to form silage. The silage so formed is discharged through the upwardly and rearwardly extending spout 10 by the inertia imparted thereto by the cutterhead 14. The silage is collected in a forage wagon trailed behind or alongside the harvester and then transported to a storage place.

If a blockage occurs in the pick-up attachment 7 or the feed rollers 21 to 24, the operator normally stops the forward movement of the machine and reverses the drive of the feed rollers and the pick-up attachment to clear the blockage by expelling the crop material in forward direction.

During the normal operation of the harvester, the components of the drive arrest mechanism and drive reversal mechanism are in the position shown in FIG. 5. This means that the shift rod arm 73 is in the F position (forward drive) and that the arm 70 abuts against the stop 81 towards the left. Furthermore, the pivot 55 between the links 56 and 57 is positioned to the left, as seen in FIG. 5, of the line connecting the pivots 59 and 58 of the link 56 with the arm 60 and the link 57 with the support or fixed member 64, respectively. The spring means 61 tend to hold these links in the position described. Thus, if the arm 60 were to pivot downwardly, as seen in FIG. 5, then the pivot point 55 would tend to move to the left, thus pulling on the link 52. However, as in the normal position this link 52 is positioned so that the pivot pin 53 on the rock lever 40 abuts the right end of the elongate slot 54, and as the rock lever 40 abuts against the stop 34, such movement to the left of the pivot pin 55 between the links 56 and 57 is prevented. This also means that in the given situation the pivot pin 59 between the arm 60 and the link 56 is a fixed point, or in other words that the arm 60 is firmly held in the position shown in FIG. 5. Now when the operator wants to clear a blockage, he pushes rearwardly a handle 90 on the rod 80 after having stopped the forward motion of the machine. This results in a rearward pivotal movement of the arm 70 away from the stop 81 (to the right in FIG. 5). As the arm 60 with the conical gear 67 thereon is firmly held in position, this results in an angular displacement of the conical gear 68 around the shaft 65 together with the arm 70. Thus the conical gear 68 is rolled over the conical gear 67 and as a reaction, the conical gear 71 is rotated around its axis, thereby rotating the shaft 65. Thus the arms 73, together with the gear shift rod 76, are moved first to the N (neutral) position, wherein the drive is interrupted and then to the R position wherein the drive is reversed. The F, N and R positions of the arms 73 correspond to the F, N and R positions of the arm 70.

When the blockage is cleared by the expulsion in a forward direction of the offending crop material in the machine, the normal drive position can be re-established by pulling the handle 90 and causing all components to move in directions opposite to those described above. Thus the reversing gearbox 16 first is placed in neutral (N) and then in forward drive (F). It should be noted that, as is conventional, the cutterhead 14 has been neither reversed nor stopped during the reverse drive of the feed rolls 21–24 and the pick-up 7. This is because the cutterhead is driven at a very high speed and is relatively heavy, whereby the inertia thereof is considerable and does not permit instantaneous reversal. This is of no consequence as blockages do not normally occur in the cutterhead.

Thus, the provision of the metal detector and associated components does not interfere with the conventional drive reversal process for clearing blockages in the pick-up or attachment and the crop feeder means using the linkage system just described which is interrelated with the linkage system controlling the breaking of the drive train for the feed rolls, with each system being operable independently.

Turning now to the operation of the metal detector and the associated components, it is necessary to describe first the operation when no tramp metal is fed to the cutterhead. The various linkages are again in the position as shown in FIG. 5.

During the normal operation of the harvester, i.e. when no tramp metal is in the vicinity of the feed rollers 21 and 22, a constant signal is generated by the constant signal generating means 26 and is fed to the relay switch in the control box 83, which is positioned so as to energise the solenoid 35 from the tractor battery. The built-in relay switch in the solenoid is in the "hold" position and the plunger 35' is in the retracted position. Thereby the drive arrest system is in the retracted or inoperative position with respect to the ratchet 51. Thus the intermediate shaft 20 can be rotated in the normal manner to drive the feed rollers 21 to 24 and the pick-up 7 in the normal direction, i.e. in the direction for feeding crop material to the cutterhead 14.

If a ferrous object is delivered to the forwardmost feed rollers 21 and 22 and moves through the field of flux generated by the magnet of the magnet-coil means 27, a signal is generated and relayed to the constant signal generating means 26 whereupon the constant signal of the latter is interrupted. This results in the relay switch in the control box 83 being operated to interrupt the supply of power from the tractor battery to the solenoid 35 so that the plunger 35' is no longer held in the retracted position and falls downwardly, together with the linkage 36 and arm 38. These members move under gravity and the action of the spring 41 and movement of the arm 38 causes the pawl 91 carried thereby to engage the ratchet 51 and arrest instantaneously the drive to the feed rollers 21 to 24 via the shaft 20. At the same time, the drive transmission is disengaged or broken in the manner to be described. However, it is appropriate to note here that in known devices, the above described arresting of the feed roll and pick-up or other attachment drive results in the operation of an over-run or safety clutch. As long as the operator does not manually interfere, e.g. by pushing the handle 90 to neutral, the clutch continues to operate. According to the present invention, however, the drive train is automatically disengaged.

When the pawl 91 engages the ratchet 51, the arm 38 is kicked to the right as seen in FIG. 5 which causes the rock lever 40 to pivot to the right around pivot 44 until it abuts against the shock absorber 47 of the stop means 46. This pivotal movement of the rock lever 40 pulls the link 52 to the right and moves with it the pivot pin 55 between the links 56 and 57. The links 56 and 57 are thus pivoted to the position shown in FIG. 6, in which position the pivot pin 55 is positioned to the right of the line connecting the pivots 59 and 58. The spring means 61 tend to hold the pivot pin 55 to the right of the line connecting the pivots 59 and 58. As the pivot 58 is attached to the fixed member 64, the arm 60 with the pivot 59 thereon is pulled in the direction of the fixed pivot 58 by the above described movement of the link 52. This results in the rotation of the conical gear 67, which via conical gear 68, causes the third conical gear 71 and shaft 65 to pivot so as to move shift rod 76 to the N position via the arms 73, whereby the gearbox 16 is put into neutral. Thus the drive train to the feed rollers 21 to 24 and the pick-up 7 is broken at the same time as the shaft 20 is arrested. The various linkages may be adjusted in such a manner that the drive train is disengaged just prior to the drive being arrested to minimise shock loading on the gear train. It should be noted here that whilst the arms 73 are in the (N) neutral position, with the drive train disengaged or broken, the arm 70 is still in the F position. This means that the arm 70 abuts against the stop 81 towards the left in FIG. 5. This also means that the operator cannot by mistake pull on the handle 90 and re-establish drive in the forward direction, as this is prevented by the stop 81.

The stop means 77 on the arm 60 cooperate with the abutment 78 on the fixed member 64 to prevent the arm pivoting too far when the link 52 is pulled.

As soon as the rock lever 40 is pivoted to the right, as seen in FIG. 4, by the engagement of the pawl 91 with the ratchet 51, the switch 48 is opened for a purpose to be explained.

As soon as the undesired object has been detected, the drive of the feeder mechanism 9 and the pick-up 7 stopped and the drive train therefore interrupted, the only task the operator has to do is to stop the forward movement of the machine and to reverse the drive. To reverse the drive, the operator pushes the handle 90 rearwardly, thus causing the arm 70 to pivot to the N position. As the rock arm 38 is still held by the ratchet 51, the lever 40 and the link 52 are firmly held in their extreme right-hand positions as shown in FIG. 6. Thus the pivot 55 can be considered as a fixed point at this time. The arm 60 is equally firmly held in the position shown in FIG. 6. Pushing the handle 90 rearwardly causes the arm 70 to move from the F to N position and results, via the arm 70, the gears 68 and 71, the shaft 65 and the arms 73, in shifting the shift rod 76 from the N to the R position. The drive to the feed rollers 21 to 24 and the pick-up attachment 7 is thus engaged in the reverse direction and the undesired object is expelled from the machine. With the reversal of the drive to the shaft 20, the force of engagement between the ratchet 51 and the pawl 91 is released. At this moment the arm 70 is still in the N position although the shift rod 76 is already in the R position. This means that pivot point 75 cannot move further towards the reversing gearbox 16. Moving the arm 70 from the N to the R position will not affect the position of the pivot 75 but instead will cause arm 60 to pivot around the shaft 65 in a direction away from the pivot 58 on the fixed member 64. Therefore, the arm 60 pulls on the links 56, 57 and 52 to bring them to their original positions as shown in FIG. 4. The spring 50 acting on the rock lever 40 assists by pivoting the lever 40 to the left in FIG. 4 and releasing the force on the link 52 via pivot 53. The spring 50 thus ensures the return of the rock lever 40 to its initial, extreme left-hand position as seen in FIG. 5. Simultaneously, with the removal of the tramp metal the switch 48 is closed again by the return of the lever 40 to its initial position, so that the solenoid 35 is re-energised by reconnection to the tractor battery, the relay switch in the control box 83 already being closed. Initially, the built-in relay in the solenoid 35 is in the "pull" position for lifting the solenoid plunger 35' and the rock arm 38. Once this lifting has been effected, the built-in relay automatically switches to the "hold" position in which only a low current is supplied to the solenoid 35 sufficient to maintain the plunger 35' and rock arm 38 in the raised position.

Returning to the moment when a piece of tramp metal is detected, the interrupt signal applied to the constant signal generating means is produced by a change in the flux field of the magnet of the magnetic-coil means 27. As soon as the drive is stopped and the detected tramp metal stationary, there is no longer a change in this flux field and, therefore, if no precautions were taken, the solenoid 35 would be re-energised because the constant signal from the generating means 26 would be re-established so that the relay switch in the control box would revert to its original position, thereby again connecting power to the solenoid, with the result that the rock arm 38 would be lifted. However, as explained above, the rock arm 38 is firmly held in the downward position as long as the drive has not been reversed. Thus the solenoid 35 cannot lift the rock arm 38 in the given situation and the built-in relay in the solenoid would remain in the "pull" position, supplying a high current to the solenoid during a prolonged period of time. This might cause damage to the solenoid or to a circuit breaker mounted thereon. If a circuit breaker were provided it would be "cycling" as long as the solenoid is prevented from lifting the rock arm 38. To avoid this, the electric switch 48 has been provided in the solenoid circuit. The switch 48 is arranged so that it is opened when the rock lever 40 is pivoted to the extreme right position as seen in FIG. 5. Thus, as long as the rock arm 38 is clamped by the force of engagement with the ratchet 51, the solenoid 35 cannot be energised so that no damage thereto due to overheating or to an associated circuit breaker can occur. It will be noted that the detector automatically resets itself on removal of the detected object.

After having reversed the drive in the manner described for clearing the undesired object, the operator pulls on the handle 90 thus shifting the rod 80 in a forward direction. This causes the arm 70 to pivot towards the front around the shaft 65. In the present situation, the links 56 and 57 are already in their original position as shown in FIG. 5. Thus the pivot point 55 is to the left, as seen in FIG. 5, relative to the line connecting the pivots 59 and 58. The forward pivotal motion of the arm 70 around the shaft 65 tends to push the arm 60 and the pivot 59 thereon in a direction towards the pivot 58. This is prevented by the link 56 and the link 52 which are restrained from further pivoting to the left, as seen on FIG. 5, by the rock lever 40 abutting against the stop 34. Accordingly, a pivotal movement of the arm 70 from the R to F position, via the N position, results in a rolling of the conical gear 68 over the conical gear 67 and thus also in rotation of the conical gear 71 causing the arms 73 to pivot from the R to the F position, via the N position. Thus, the reverse drive of the feed-rollers 21 to 24 and of the pick-up attachment 7 is first interrupted (neutral position) and then the feed roller and the pick-up drives re-engaged so that normal harvesting operation can be continued.

The above described arrangement is particularly useful when applied on machines having a reversing gearbox with a double jaw clutch mechanism.

MODIFICATIONS

With reference to the FIGS. 12 to 19, another embodiment of the present invention will now be described. Components of this embodiment similar to those of the first described embodiment have been ascribed like reference numerals.

The rear feed rollers 23 and 24 are driven from the reversing and reduction gearbox 16 via a serpentine chain arrangement 201. The reduction and reversing gearbox 16 comprises conventional reduction gears and a conventional, double-acting, friction-type reversing mechanism. As these components are generally known in the art, they are not shown and will not be described in any further detail. The serpentine chain arrangement 201 comprises six sprockets and a single chain 202 wrapped therearound in a manner to be described. A first sprocket 203 is keyed on an output shaft 114 of the reversing gearbox 16 and is rotated in the direction 204. Second and third sprockets 205 and 206 are secured on the shafts 106 and 110, respectively, of the lower and upper rear feed rollers 23 and 24. The chain 202 is wrapped around the sprockets 205 and 206 in a manner such that the sprocket 205 is provided outside the loop of the chain 202 and the sprocket 206 is provided within said loop, whereby the feed rollers 23 and 24 are driven in the opposite directions 207 and 208. The chain 202 is also wrapped around a reversing sprocket 209 which is rotatably mounted on a fixed support, and around a pair of tension rollers 210 and 211 rotatably mounted on a spring-loaded pivot arm 212. The forward feed rollers 21 and 22 are driven from the rear feed rollers 23 and 24 in a conventional manner.

In this embodiment, the ratchet 51 is keyed on the shaft 106, and not on shaft 20, which is additionally rotatably supported in support members 213, 249 secured to the beam 2 of the frame 1 and the gearbox 16, respectively.

The electric and electronic components of the embodiment presently under consideration are identical to those of the first embodiment. Only the mechanical components are different.

Figure 12:
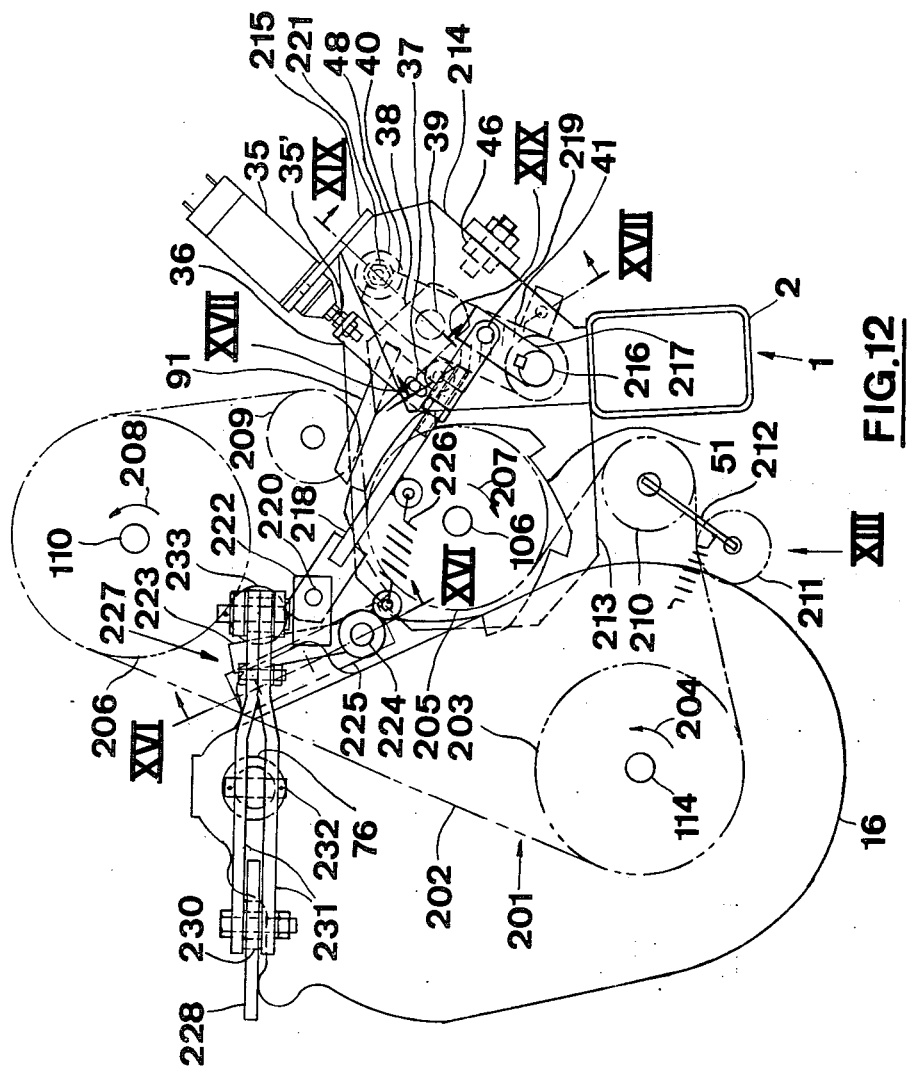
FIG. 12 is a view similar to FIG. 4 illustrating another embodiment of the invention.

The mechanical components employed to interrupt the feeder drive mechanism are shown in the FIGS. 12–13 and will be described now in further detail. A support member 214 is secured to the main beam 2 and supports an element 215 extending between the support members 213 and 214 for mounting thereon the solenoid 35. As in the first embodiment, the linkage 36 extends downwardly from the barrel or body of the solenoid 35 and normally supports at pin 37 the rock arm 38 carrying the pawl 91, the arm 38 being pivotally mounted at 39 on the generally upright rock lever 40. The spring means 41 extending between the rock arm 38 and the rock lever 40 urge the rock arm 38 in a downward direction against the normal holding force of the solenoid 35. In this embodiment, the rock lever 40 is secured at its lower end on a pivot shaft 216 which is rotatably mounted on the support members 213, 214. The rock lever 40 is movable between the support members 213, 214 and supports at its end opposite to the pivot shaft 216 an actuator 221 which is arranged to close the electric switch 48, mounted on one of the support members 213, when the rock lever is positioned in its extreme left position as shown in FIG. 12. When the rock lever 40 is moved to its extreme right position as shown in FIG. 14, the electric switch 48 is opened thus disconnecting the power supply to the solenoid 35. The rock lever 40 is movable between an extreme left position as shown in FIG. 12, where it abuts against a stop (not shown) preventing further movement to the left, and an extreme right position as shown in FIG. 14 where it abuts against the stop 46.

The pivot shaft 216 further also supports an arm 217 to which is pivotably coupled a link 218 at a pivot 219. The link 218 is pivotably connected at its other end via a pivot 220 to a pair of brackets 222 which is secured on a further arm 223. The further arm 223 is a rigid part of a rocking element 227 comprising a pivot shaft 224 pivotably mounted in supports 225 and 249. The arm 223 extends upwardly towards the reversing gearbox shifting mechanism which has yet to be described. Spring means 226 extend between the link 218 and the rocking element 227 in a manner tending to pivot the rocking element 227, the link 218, the arm 217 and the rock lever 40 to their extreme left-hand positions as shown in FIG. 12.

Figure 2:
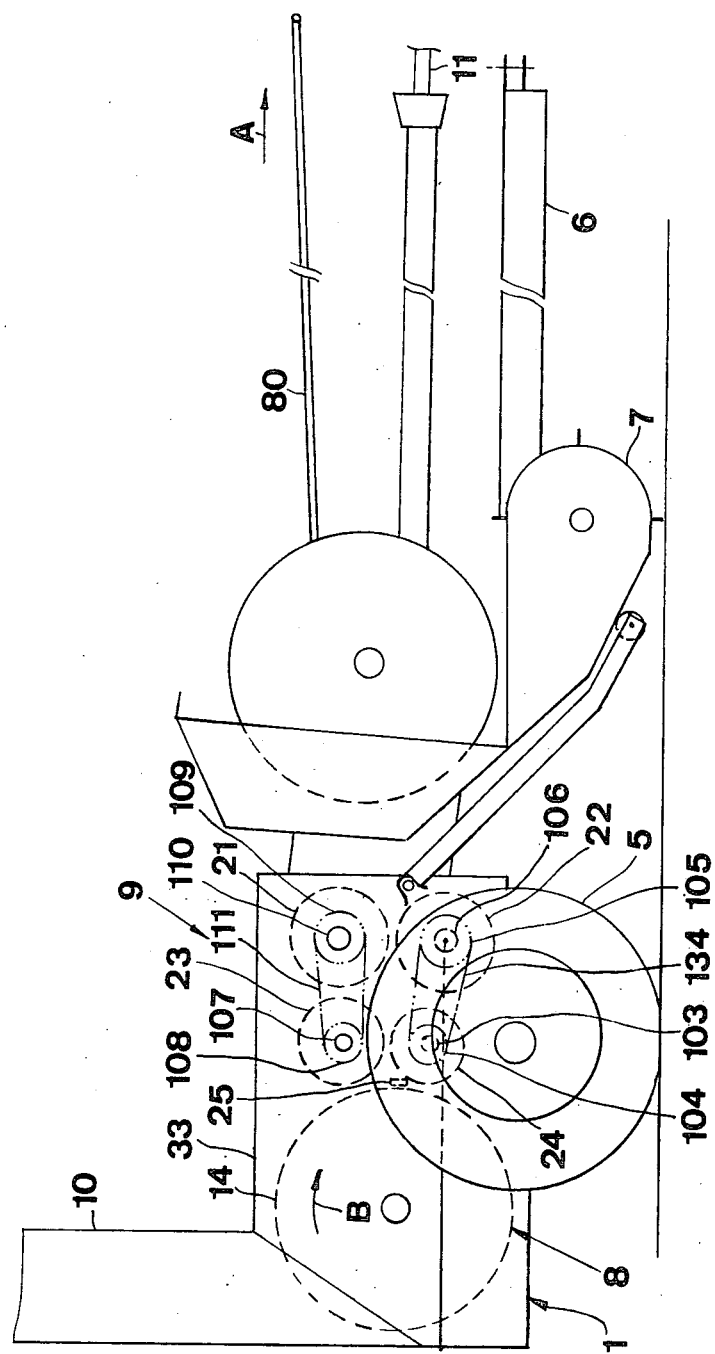
FIG. 2 is a schematic side view of the machine shown in FIG. 1.
Figure 3:
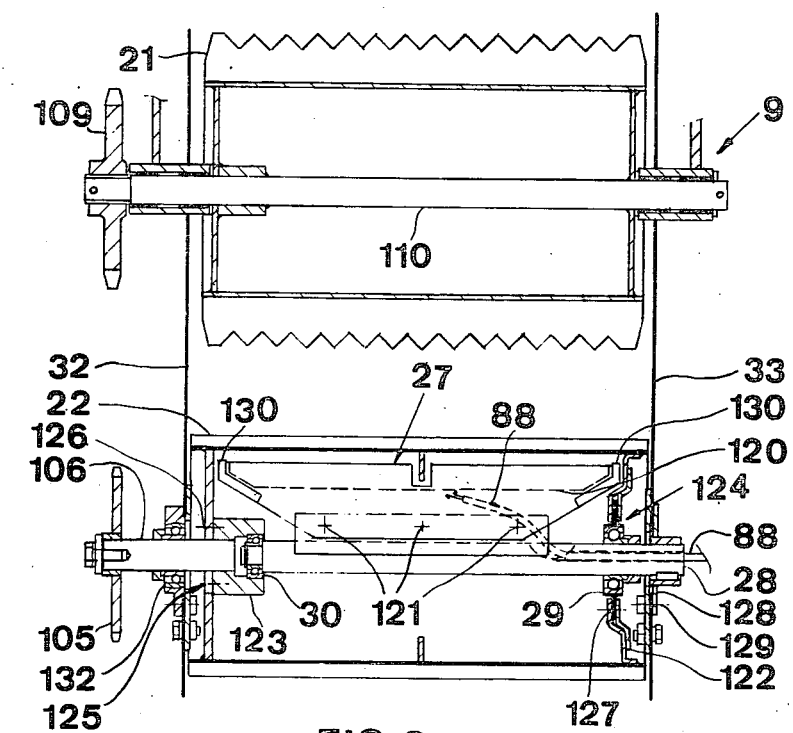
FIG. 3 is a sectional view taken along the line III—III of FIG. 1.
Figure 7:
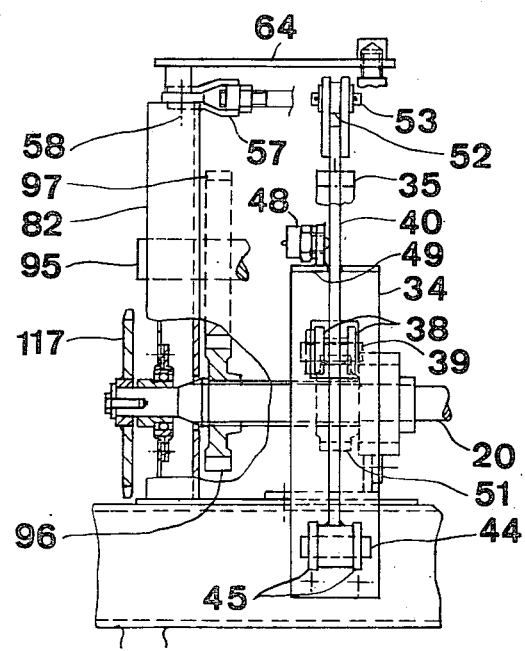
FIG. 7 is a schematic view taken in the direction of arrow VII in FIG. 4 but again with certain components omitted.

The reversing gearbox shifting mechanism comprises the arm 70 which is pivotably mounted at one end on the gearbox 16 and which is pivotably coupled at its other end to the push-pull rod 80 (only shown in the FIGS. 1 and 2 illustrating the first embodiment). Pivotably mounted on the rod 70 is a flat plate or link 228 comprising a specially shaped elongated aperture 229 of general S form and acting as a cam. A roller 230, rotatably mounted at one end of a control arm 231, is arranged within the specially shaped aperture 229. The control arm 231 is pivotably coupled intermediate its ends at 232 to the shift rod 76 of the reversing gearbox 16. The other extreme end of the control arm 231 is pivotably coupled at pivot 248 to a hollow member 233 with a collar 234. A rod 235 extends through the collar 234 and comprises an abutment end 236, which in the N (neutral) position abuts against the side 237 of the hollow member 233. A pair of nuts 238 are secured on the rod 235 at a location spaced from the abutment end 236, and an annular abutment ring 239 rests thereagainst. Spring means 240 extend between the abutment ring 239 and the collar 234. The rod 235 is pivotably coupled via pivot 241 to a link 242, which itself is pivotably mounted at pivot 243 to a support member 244 attached to a support 249. The support member 244 also supports a stop 245, the function of which will become clear. Spring means 246 extend between the pivot 243 of the link 242 on the support member 244 on the one hand, and a mounting point 247 on the rod 235, on the other hand. The spring means 246 can move from one side relative to the pivot 241 to the other side thereof, in a manner to be explained.

The further arm 223 of the rocking element 227 extends from below and to one side of the pivot 241 between the link 242 and the rod 235, on the one hand, and between the pivot 241 and the gearbox 16, on the other hand.

OPERATION OF THE ALTERNATIVE EMBODIMENT

The operation of the various linkages will now be described, starting with the mechanism in its neutral position and with the metal detection device being inoperative. This situation is shown in FIGS. 12 and 13. The arm 70, and thus also the link 228 are in their intermediate, neutral position N. The roller 230 is also positioned in its intermediate position N thus holding the control arm 231 and the shift rod 76 in the positions shown in FIG. 13. The spring means 240 are expanded and urge the pivot 248 to its lowermost position N as seen in FIG. 13. The rod 235 and the link 242 are almost aligned with each other with the pivot 241 just to the left of its "dead centre" and to the left of the centre line of the spring means 246 as seen in said FIG. 13, the spring means 246 tending to hold the pivot 241 in this position. Assuming pressure were exerted on the rod 235 in a direction towards the link 242, the pivot 241 would tend to move even further to the left as seen in FIG. 13. This further movement is prevented by the arm 223 of the rocking element 227 acting as a stop. Thus in the present situation, pivot 241 can be considered as a fixed point.

Figure 13:
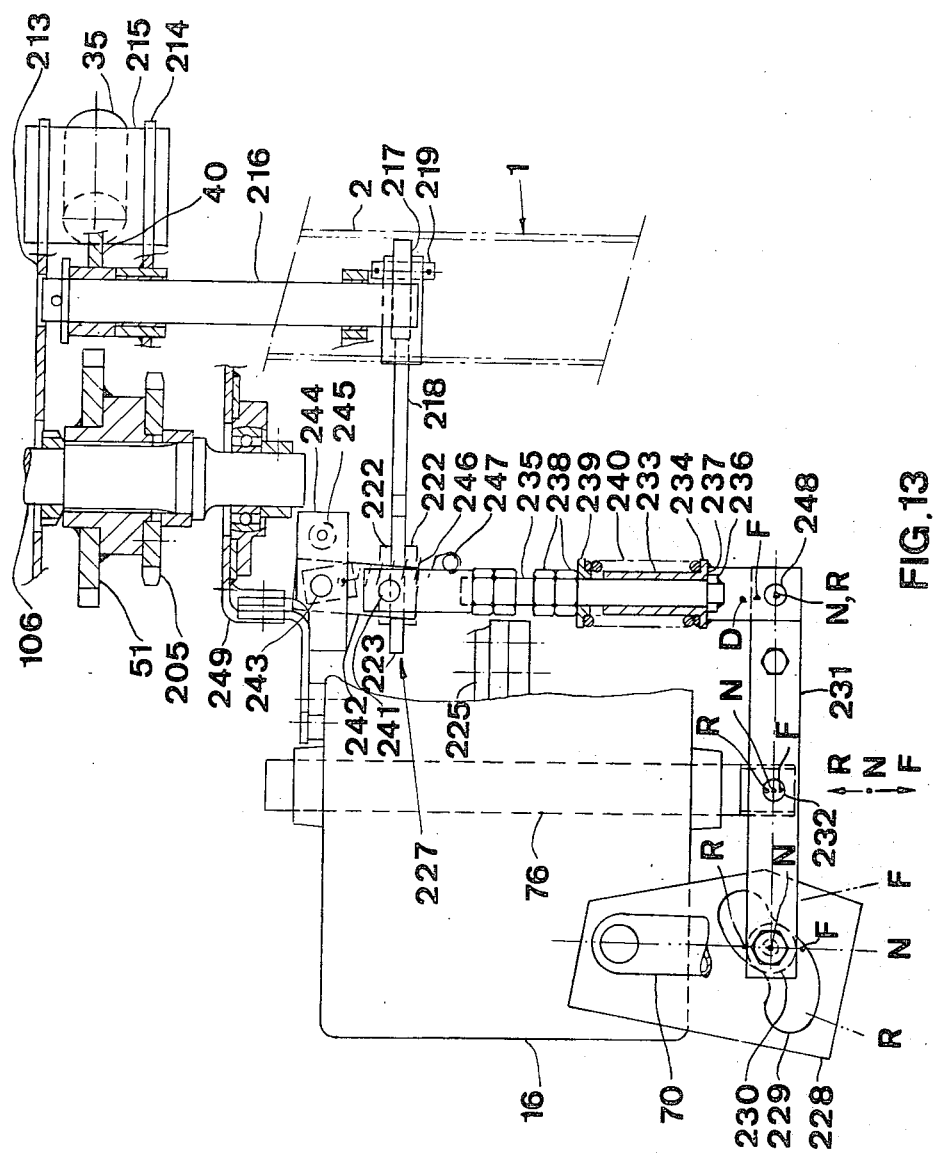
FIG. 13 is a side view taken in the direction of arrow XIII of FIG. 12 but with some components omitted for clarity.
Figure 19:
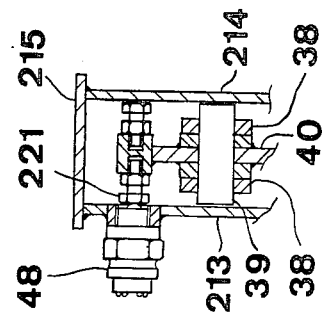
FIGS. 16, 17, and 19 are sectional views taken along the lines XVI—XVI, XVII—XVII and XIX—XIX of FIG. 12, respectively.
Figure 18:
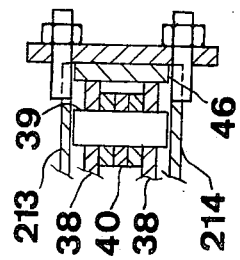
FIG. 18 is a sectional view taken along the line XVIII—XVIII of FIG. 14.
Figure 17:
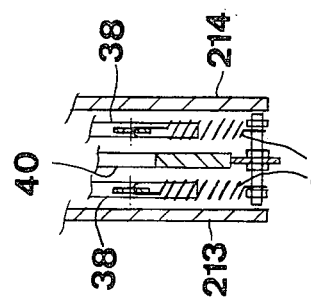
Figure 16:
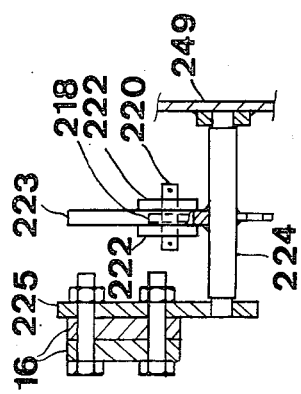

To engage the feeder drive mechanism in the normal operative direction, the operator shifts the arm 70 and the link 228 to the F position in which the roller 230 is urged downwardly by the aperture 229 as seen in FIG. 13. During the first part of this movement of the roller 230, the control arm 231 is caused to pivot around pivot 248, thus pulling the shift rod 76 out of the gearbox 16, until the friction plates of the friction clutch within the gearbox 16 engage. During the last part of this movement of the roller 230, the pivot point 232 between the control arm 231 and the rod 76 takes up a fixed lowermost position (as seen in FIG. 13). As a result, the arm 231 is pivoted anticlockwise around the pivot 232 during the last part of the aforementioned movement of the roller 230 from the N to the F position. This results in the pivot 248 between the arm 231 and the hollow member 233 being moved upwardly, as seen in FIG. 13, from the N to the F position, thus compressing the spring means 240. This compression gives the necessary pressure on the friction plates in the friction clutch. During this operation, the pivot 241 between the rod 235 and the link 242 has not moved.

If a blockage occurs in the feeder means 9, the forward movement of the machine is stopped and the drive to the feeder means is first disengaged by shifting the arm 70 to the N position. This results in the spring means 240 expanding and pushing the pivot 248 from the F to the N position, and results in the shift rod 76 being pushed to its intermediate N position. To clear the blockage, the operator normally wants to reverse the feeder drive so as to expel the offending material in a forward direction from between the feed rollers 21 to 24. This is accomplished by moving the arm 70 and the associated link 228 to the R position. In this way the roller 230 is urged upwardly (as seen in FIG. 13) by the aperture 229 and the shift rod 76 is urged to its fully retracted position R until the reverse drive friction plates within the gearbox engage. As soon as this happens, pivot 248 tends to move downwardly as seen in FIG. 13. This is prevented by the face 237 of the hollow member 233 abutting against the abutment end 236 of the elongate rod 235, whereby the arm 231 pulls on the rod 235. Thus the R position of the pivot 248 coincides with the N position thereof. As long as the operator pushes the rod 70 to the R position, the feeder mechanism 9 is driven in reverse.

When the blockage has been cleared, the normal drive position can again be re-established after first having interrupted the reverse drive to the feed rollers 21 to 24 and the pick-up attachment 7. It will be seen that in this embodiment also the detection device for ferrous objects and its associated components does not interfere with the normal drive reversal process for clearing blockages in the pick-up or attachment or in the feeder means.

As already mentioned, the electric and electronic components of the present embodiment are identical to those used in the first embodiment. It will be assumed that the various linkages are in the forward drive position F described above. When a ferrous object is delivered to the forwardmost feed rollers 21 and 22 and moves through the flux field generated by the magnet of the magnet-coil means 27, the solenoid plunger 35' and the arm 36 move downwardly due to de-energisation of the solenoid in the manner described in the first embodiment. Gravity and the force of the spring 41 urges the rock arm 38 with the pawl 91 thereon downwardly so that the pawl 91 engages the ratchet 51. The pawl 91, rock arm 38 and rock lever 40 are thus kicked to the right, as seen in FIG. 12, until the rock lever 40 abuts the stop 46 and disengages the switch 48 to opencircuit the solenoid 35. The locking of the ratchet 51 immediately interrupts the drive to the feed rollers 21 to 24. In known devices using similar drive interrupt means, the structure has to take up both the inertia forces and the full power which is normally supplied to the feeder mechanism. In the present invention, the drive train to the feeder mechanism 9 is broken in addition to the drive to the feeder mechanism being arrested. The automatic disengagement of the drive train will now be described in greater detail.

The pivotal movement of the rock lever 40 results in the link 218 being pulled to the right, as seen in FIG. 12, causing the rocking element 227 to pivot clockwise, also as seen in FIG. 12. Hence the arm 223 engages the rod 235 and the link 242 at their mutual pivot 241 and urges this pivot 241 in a direction away from the gearbox 16. The stop 245 on the support member 244 restricts this movement. The new position of the linkages 235; 242 is shown in FIG. 15. It will be seen that the pivot 241 has moved to the other side of the spring means 246, whereby the latter tend to hold the linkages in their new position. As pivot 243 is stationary relative to the frame, pivot 241 has moved upwardly as seen in FIG. 15 allowing the compression spring 240 to expand and the pivot 248 between the hollow member 233 and the arm 231 to move further upwardly to take the position D (detection). Position D is the uppermost position of the pivot 248 (FIG. 15). As at this moment the roller 230 is in its lowermost position (F) in the shaped aperture 229, the central pivot 232 of the control arm 231 with the shift rod 76 takes up the intermediate position N. Therefore, the friction clutches within the gearbox 16 have been disengaged and thus the drive train to the feed rollers 21 and 24 and the pick-up attachment 7 broken. Dependent on the transmission ratios of the various linkages, the breaking of the drive train may either precede or coincide with the arrest of the drive to the feeder mechanism.

It will be clear that in the present situation, as the arm 70 and the associated link 228 are still in the F position, the operator cannot, by mistake, re-engage the drive in the normal operative direction without first reversing the drive to remove the detected ferrous material.

To reverse the drive, the operator pushes the arm 70 and the associated link 228 towards the R position. In the first half of this movement, i.e. from the F to the N, of the arm 70, the pawl 91 is still firmly held in its lowered position by the ratchet 51 so that all linkages are also firmly held in the positions shown in FIGS. 14 and 15. Thus the pivot 241 between the rod 235 and the link 242 cannot yet return to its initial position. Also, apart from the restricted displacement allowed by the compression of the spring means 240, the pivot 248 between the arm 231 and the hollow member 233 is almost firmly held in its new position. When the roller 230 moves to the N position, the shift rod 76 is moved towards the R position, whereupon the drive is reversed and the undesired object expelled from the machine. At the same time, the force of engagement between the ratchet 51 and the pawl 91 is released.

Moving the arm 70 and the associated link 228 from the N to the R position causes the pivot 241 to approach the gearbox 16 and the link 242 and the rod 235 to assume a straight line position because at this moment, the pivot 232 between the arm 231 and the shift rod 76 is fixed. Indeed, the rod 76 has already assumed its fully retracted position and thus abuts against a stop. Whilst the roller 230 is approaching the R position, the control arm 231 is pivoted in a clockwise direction around the pivot 232 causing the pivot 248 to assume its R/N position. The spring means 246 help the pivot 241 to reach its original position and the spring means 226 cause the rocking element 227 to pivot anticlockwise, as seen in FIG. 12, and to move with it the link 218 and the rock lever 40. Thereby the electric switch 48 is again closed and the solenoid 35 re-energised so that it lifts the rock arm 38 and pawl 91 out of engagement with the ratchet 51. Thus, all linkages have assumed their initial positions. However, as yet, the drive is still engaged in the reverse direction.

By shifting the arm 70 and the associated link 228 to the N position, the arm 231 pivots around pivot 248 which remains in the R/N position, thus causing the shift rod 76 to take up the N position, whereby the drive is interrupted. Now the drive can be re-engaged in the normal working direction in the manner already explained in connection with the first embodiment.

It will be seen that a very satifactory detection device and drive interruption system are provided which are effective in preventing ferrous material being fed to the crop processing apparatus. The invention is operative, upon detection of an undesirable object, to arrest the drive means to the feeder mechanism and to interrupt the drive train of that mechanism so that no damage is caused thereto either by the abrupt stopping of the feeder mechanism or by the undesired object reaching the crop processing means. With the present invention, when ferrous material is detected and the feeder mechanism drive instantaneously arrested, there are less risks for damage being caused to the drive means, because, contrary to what happens in certain known devices, the mechanism has no longer to take up the full power normally supplied to the feeder mechanism and the pick-up or other attachment in addition to the inertia forces. Indeed, simultaneously with, or before, the arresting of feeder mechanism, the drive train thereto is broken.

The whole action from detection to stopping the feeder mechanism and breaking the drive train takes about 1/20 of a second.

Furthermore, protective measures are automatically taken to avoid damage to the electrical components due to overheating, for example. Also, the operator is prevented from making mistakes in resetting the mechanism which could otherwise result in damage.

I claim:
1. A harvesting machine comprising:
(a) a chassis,
(b) a crop processing means on the chassis for operating on crop material fed thereto,
(c) feeder means for feeding crop material to the crop processing means,
(d) a drive train for driving the feeder means,
(e) detector means associated with the feeder means for detecting undesirable objects passing through the feeder means towards the crop processing means,
(f) drive arresting means associated with the drive train of the feeder means, and
(g) drive train interrupting means adapted to interrupt the drive train to the feeder means independently of said arresting means,
(h) said detector means being operable upon detection of an undesirable object to cause the arresting means to initiate arrest of the drive to feeder means and to also cause said drive train interrupting means to interrupt the drive train simultaneously or preceding said arrest to reduce the load on the drive train during arrest.

2. A harvesting machine as set forth in claim 1 wherein the drive train comprises a drive reversal mechanism which can be changed from a normal drive direction to a reverse drive direction via a neutral position in which the drive train is interrupted and wherein the drive train interrupting means include means coupled to the drive reversal mechanism and are rendered operably by the detector means automatically to change the drive reversal mechanism to the neutral position upon the detection of an undesirable object and thus to break the drive train.

3. A harvesting machine as set forth in claim 2 and further comprising a shaft driven by the drive reversal mechanism which shaft in turn drives the crop feeder means and wherein the drive arresting means also comprise,
a link pivotally mounted between a first and a second extreme position,
a pawl means carried by said link,
a ratchet means fixed to said shaft driven by the drive reversal mechanism, and
holding means for holding the pawl means out of engagement with the ratchet means in the absence of an undesirable object in the feeder means and for permitting the pawl means to engage the ratchet means when the presence of an undesirable object in the feeder means is detected by the detector means so as to kick the link carrying the pawl means to one of its extreme positions and to arrest the drive to the feeder means.

4. A harvesting machine as set forth in claim 3 wherein the drive arresting means also comprise shock absorbing stop means operale to stop movement of the link as it reaches its second extreme position when an undesirable object is detected in the feeder means.

5. A harvesting machine as set forth in claim 3 wherein the pawl means are pivotally mounted on the link and wherein the drive arresting means also comprise resilient means extending between the pawl means and the link for urging the pawl means in a direction toward the ratchet means and opposite to the holding force of the holding means.

6. A harvesting machine as set forth in claim 2 wherein the drive train interrupting means are coupled at one end to the drive arresting means and at the other end to the drive reversal mechanism, the arrangement being such as to automatically change the drive reversal mechanism to the neutral position and thus to break the drive train when an undesirable object is detected by the detector means in the feeder means.

7. A harvesting machine as set forth in claim 3 wherein the holding means comprise a solenoid with a plunger which is movable between a retracted position when the solenoid is energized and on extended position when the solenoid is deenergized, and a linkage means coupled at one end to the plunger of the solenoid and cooperable at its other end with the pawl means for holding the pawl means in an inoperative position when the solenoid is energized and for causing the pawl means to move to an operative position when the solenoid is de-energized.

8. A harvesting machine comprising
(a) a chassis,
(b) crop processing means on the chassis for operating on crop material fed thereto,
(c) feeder means for feeding crop material to the crop processing means;
(d) detector means associated with the feeder means for detecting undesirable objects passing through the feeder means in the direction of the crop processing means,
(e) a drive train with a reversible gearbox therein and a drive transmission means extending between the reversible gearbox and the feeder means for driving said feeder means, the reversible gearbox being shiftable between a normal drive position and a reverse drive position via a neutral position wherein the drive train is interrupted,
(f) ratchet means coupled to the drive transmission means,
(g) pawl means,
(h) holding means between the pawl means and the detector means for holding the pawl means out of engagement with the ratchet means in the absence of an undesirable object in the feeder means and for causing the pawl means to engage the ratchet means as the detector means detects the presence of an undesirale object in the feeder means so as to instanteously arrest the drive to the feeder means, and
(i) coupling means between the detector means and the reversible gearbox operable to shift the reversible gearbox from its normal drive position to its neutral position as the detector means detects the presence of an undesirable object in the feeder means and as the pawl means engages the ratchet means for arresting the drive to the feeder means.

9. A forage harvester comprising
(a) a cutterhead for chopping crop material,
(b) at least one feed roll forwardly of the cutterhead for compressing the crop material and for feeding said crop material to the cutterhead,
(c) harvesting means attachable to the forage harvester forwardly of the at least one feed roll and operable to harvest crop material and to supply said crop material to said at least one feedroll for further transportation thereby,
(d) drive means for driving the harvesting means, the at least one feed roll and the cutterhead, the drive means to the harvesting means and the at least one feed roll comprising a drive reversal mechanism and a drive transmission means between said drive reversal mechanism on the one hand and the at least one feed roll and the harvesting means on the other hand, the drive reversal mechanism being positionable in a normal drive position, a reverse drive position and a neutral position therebetween wherein the drive train is interrupted,
(e) detector means associated with the at least one feed roll for detecting undesirable objects passing in the vicinity of the at least one feed roll in the direction of the cutterhead,
(f) drive arresting means associated with the drive transmission means and
(g) drive interrupting means associated with the drive arresting means and the drive reversal mechanism, the detector means being operable upon detection of an undesirable object to cause the arresting means to arrest the drive transmission means and the drive interrupting means to shift the drive reversal mechanism from its normal drive position to its neutral position so as to interrupt the drive train to the at least one feed roll and to the harvesting means and hence to prevent the undesirable object to move further in the direction of the cutterhead, the drive arresting means and the drive interrupting means being so arranged that the interruption of the drive train is effected not later than the arresting of the drive to the at least one feed roll and the harvesting means.

* * * * *